United States Patent
Fink

[15] 3,668,772
[45] June 13, 1972

[54] AUTOMATED SYSTEM INCLUDING INDEXING MECHANISM

[72] Inventor: Frank J. Fink, Chardon, Ohio

[73] Assignee: Imperial Manufacturing and Engineering Company, Middlefield, Ohio

[22] Filed: Dec. 22, 1969

[21] Appl. No.: 886,970

Related U.S. Application Data

[63] Continuation-in-part of Ser. No. 712,743, March 13, 1968, abandoned.

[52] U.S. Cl. .................................29/563, 29/38 C, 29/33 P, 90/56
[51] Int. Cl. .................................B23p 23/00, B23q 1/10
[58] Field of Search................29/38 C, 563, 33 P, 208 F; 223/111, 118

[56] References Cited

UNITED STATES PATENTS

| | | | |
|---|---|---|---|
| 1,962,567 | 6/1934 | Lovejoy | 29/38 C X |
| 2,842,985 | 7/1958 | Grover | 29/38 C X |
| 3,313,014 | 4/1967 | Lemelson | 29/33 P |
| 3,336,823 | 8/1967 | Bonzi | 29/38 C X |

Primary Examiner—Andrew R. Juhasz
Assistant Examiner—Z. R. Bilinsky
Attorney—McNenny, Farrington, Pearne & Gordon

[57] ABSTRACT

An indexing system including an indexing table and a press unit is disclosed in which a device is provided to prevent substantial forces from being applied to the table support bearings. In a first embodiment, a coupling arm is connected to a press tool support unit which floats radially relative to the indexing table and is positioned to provide contact between the indexing table and the floating press. The indexing table is provided with a bearing surface normal to the direction of the force applied by the press at a location adjacent to the point where the press contacts the work piece secured to the table. The coupling arm bears against the table bearing surface so that the force applied to the outer edge of the indexing table by the press is returned directly to the tool support to minimize the force applied to the table support bearing. In a second embodiment, a pair of jaws are provided on the press tool support unit which are closed behind a mating surface on the work piece to transmit the reaction force directly between the work piece and the press unit and to prevent any of the reaction force from being applied to the table structure.

19 Claims, 6 Drawing Figures

INVENTOR.
FRANK J. FINK
BY
MCNENNY, FARRINGTON, PEARNE & GORDON

ATTORNEYS

INVENTOR.
FRANK J. FINK
BY
MCNENNY, FARRINGTON, PEARNE & GORDON
ATTORNEYS

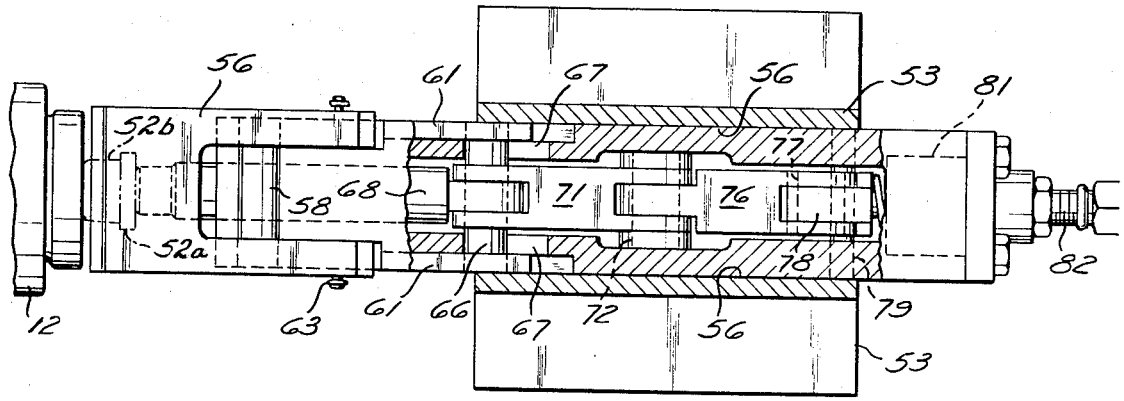
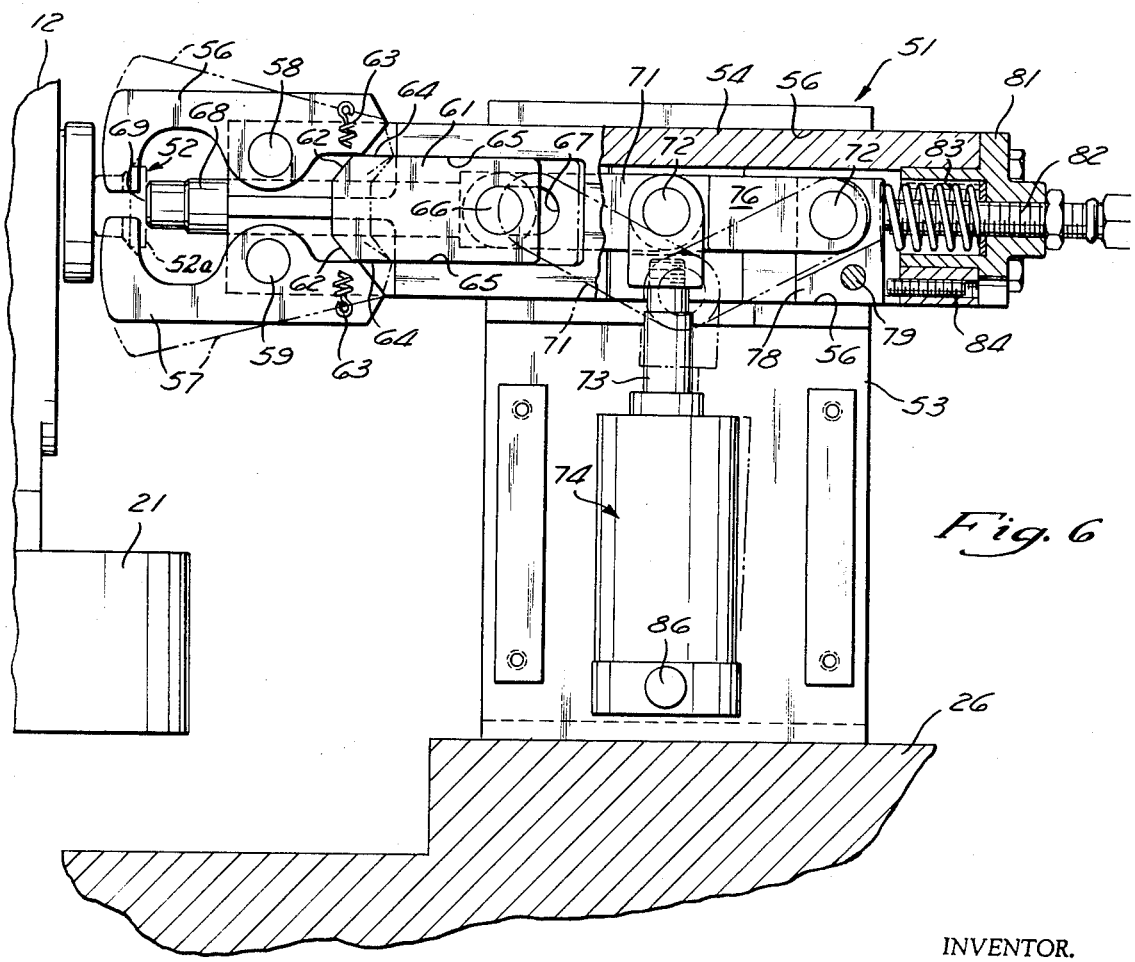

[3,668,772]

AUTOMATED SYSTEM INCLUDING INDEXING MECHANISM

This is a continuation-in-part of my copending application for U.S. Letters Patent, Ser. No. 712,743, filed Mar. 13, 1968 and now abandoned.

BACKGROUND OF THE INVENTION

This invention relates generally to an indexing table of the rotary turret type which carries a work piece sequentially from one work position to another for progressive working operations, and more particularly to a machine system for such indexing tables which minimizes loads applied to the table and table support bearings.

PRIOR ART

Automated machine systems often include an indexing table which progressively moves a work piece to a plurality of working stations for progressive working by processing or working devices located at the work stations. Such processing devices may be arranged to perform a variety of working operations on the work piece. For example, such devices may be arranged to perform drilling operations, tapping operations, or various other cutting operations. Also in some installations, one or more of the processing devices may be arranged to press an insert into the work piece. In almost all cases the processing device exerts a working force on the work piece supported by the indexing table and such work forces can, particularly when they are of relatively large magnitude, cause deflections of the indexing table such that precise positioning of the work piece is not maintained. The accuracy of a machine system of this type is determined to a large extent by the accuracy with which the indexing table positions the work piece at each of the work stations. Therefore, the overall accuracy of the system is adversely affected if the working forces applied to the work piece cause movement thereof from the desired work piece position.

In the past, it has generally been the practice to overcome this problem by constructing the indexing table with a high degree of rigidity utilizing relatively massive table and frame structures and heavy bearings to minimize the deflections or movements resulting from the working forces applied to the work pieces.

SUMMARY OF INVENTION

An indexing system in accordance with this invention provides force transmitting means which operate to transmit a reaction force, applied to a work piece carried by the indexing table, by a processing device substantially directly between the work piece and the processing device without applying substantial forces to the table structure or the table bearings. Therefore, in such a system large working forces can be applied to a work piece without causing table distorting forces of sufficient magnitude to adversely affect the positioning of the work pieces by the table structure. Therefore, excessively large bearings and massive table structures are not required to insure proper positioning of the work piece.

In one illustrated machine system the indexing mechanism is a table journaled in spaced bearings on the machine frame for rotation about a fixed axis. The table supports a plurality of work piece holding devices symmetrically positioned around the axis and a plurality of processing devices are located at the work stations. At least one of the processing devices is mounted on the machine frame for limited movement in the direction of the working force applied by that processing device to the work piece. Also included are mutually engageable bearings, associated with such processing device, which are substantially perpendicular to the direction of the reaction force. One of the bearing surfaces is carried by the indexing table and the other by the processing device. Therefore, a substantial portion of the reaction force is transmitted directly between the work piece holder and the processing device and the principal supporting structure of the table is not subjected to any substantial portion of the reaction force. Precise positioning of the work piece is, therefore, achieved since such supporting structure of the indexing table is not subjected to the entire reaction force applied to the work piece.

In a second embodiment of this invention a similar indexing table structure is provided. However, one of the processing devices is provided with jaw means which are operated to grip the work piece and transmit the working force directly between the work piece and the processing device. With this embodiment, extremely large working forces can be applied to the work piece since none of the reaction force is transmitted through the table structure. In the particular structure of the second embodiment a processing device includes a slide mounted for limited movement on the frame in a direction aligned with the force applied to the work piece. A tool is carried by the slide and is movable relative to the slide in the direction of such force. A toggle linkage is connected between the tool and slide and is operated through its center position of maximum force by a lateral actuator. Jaws carried by the slide are moved to their operative position in response to relative movement between the tool and the slide. Therefore, a single actuator operates the jaws and the tool.

OBJECTS OF INVENTION

It is an important object of this invention to provide a novel and improved machine system including an indexing table for progressively positioning work pieces at a plurality of work stations wherein means are provided to minimize the effect of the reaction forces on the table structure.

It is another important object of this invention to provide a machine system according to the preceding object wherein at least one tool support is mounted for limited movement in the direction of the working force and is provided with bearing means operable to transmit a substantial portion of the reaction force directly between the work piece support and the tool support.

Further objects and advantages will appear from the following description and drawings wherein:

FIG. 5 is a plan view partially in section of a processing device in accordance with a second embodiment of this invention in which none of the reaction forces are transmitted to the table structure; and FIG. 6 is a side elevation partially in section of the processing device illustrated in FIG. 5.

Figure 1:
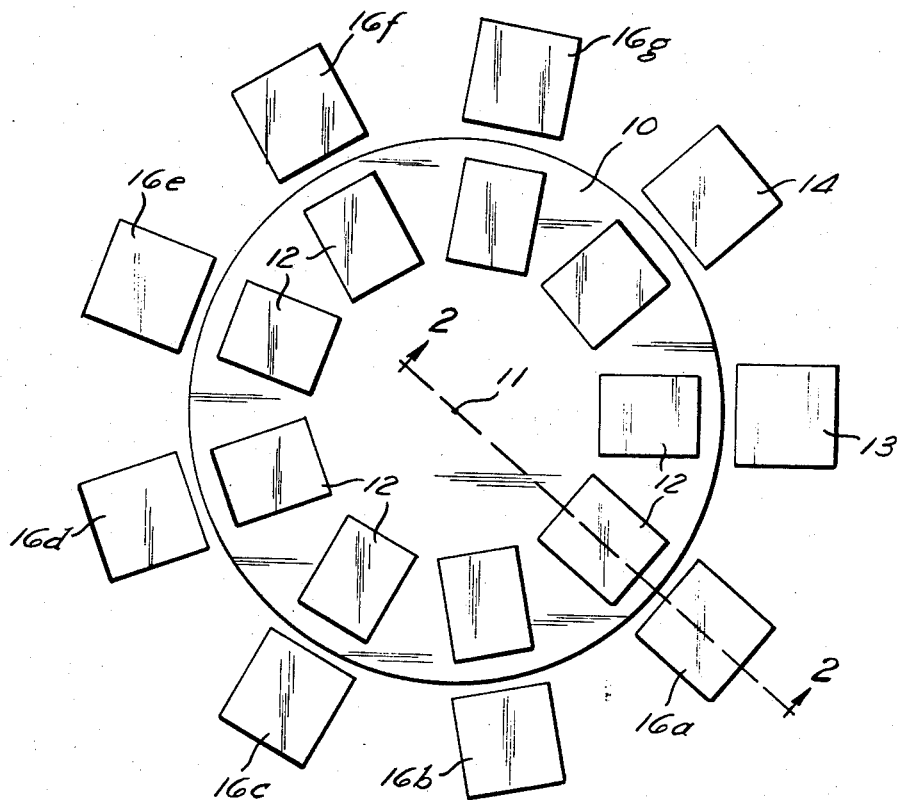
FIG. 1 is a schematic plan view of an automated machine system of the type to which this invention is particularly suited illustrating a typical arrangement of an indexing table and the tools for progressively working a work piece.

FIG. 1 schematically illustrates one form of a machine system in which an indexing table is provided to progressively position work pieces at a plurality of work stations. In this system the table 10 is journaled for rotation about the vertical axis 11. The drive for the table is arranged to rotate the table through an arc of 40° between each indexing position. Consequently, there are nine indexing positions through which the table progressively moves in returning to its initial position. Mounted on the table 10 are nine work holders 12 represented schematically by the boxes. The work holders are mounted on the table symmetrically around the axis 11 as illustrated. Automatic loading of the work pieces is provided at a loading station 13 and automatic unloading is provided at an unloading station 14. The various elements are arranged so that the work holders 12 are sequentially positioned at the loading station 13 so that a work piece may be automatically positioned and mounted on the work holder. The operation of the indexing table sequentially moves each work holder 12 from the loading station 13 to each of seven work stations 16a through 16g. At each of these work stations 16a through 16g a separate operation is performed on the work pieces carried by the work holder 12 and when the operation is completed at the work station 16g, all of the operations performed in this machine system are completed. The work piece then moves to an unloading station 14 where it is automatically removed from the adjacent work holder.

Figure 2:
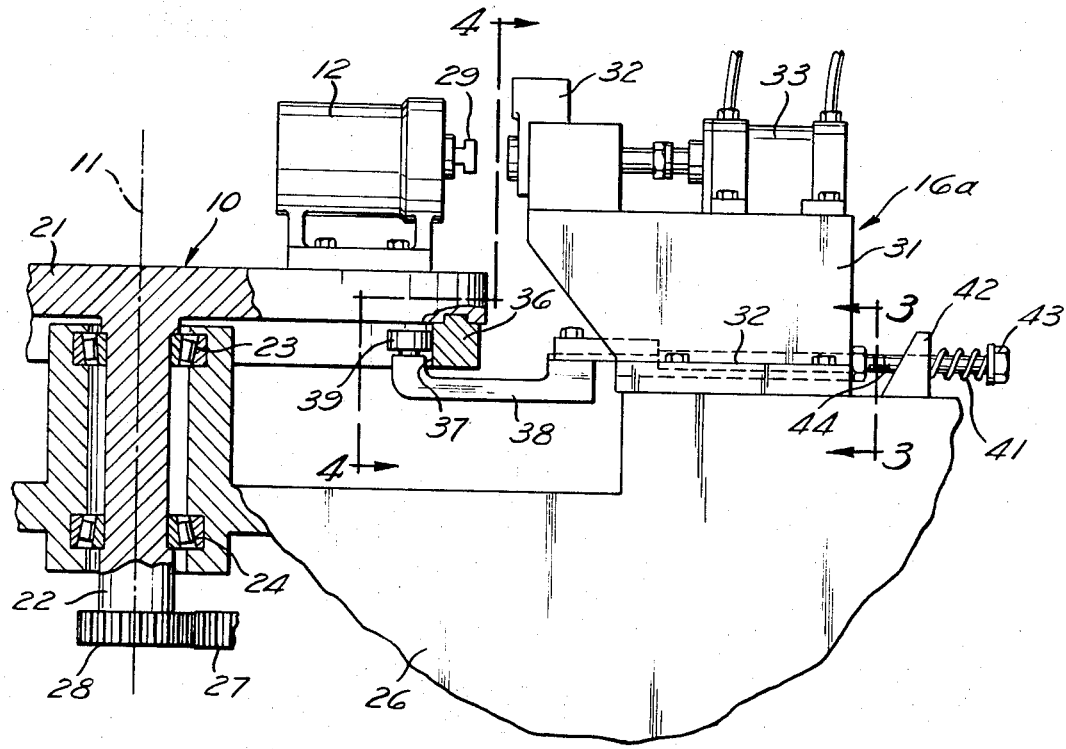
FIG. 2 is a view taken generally along 2—2 of FIG. 1 illustrating one preferred embodiment of this invention.
Figure 4:
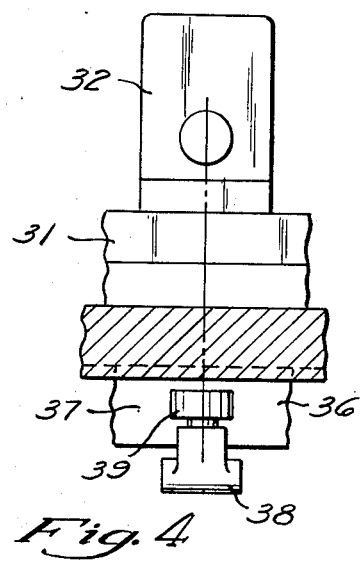
FIG. 4 is a side elevation of the tool support unit taken along 4—4 of FIG. 2.
Figure 3:
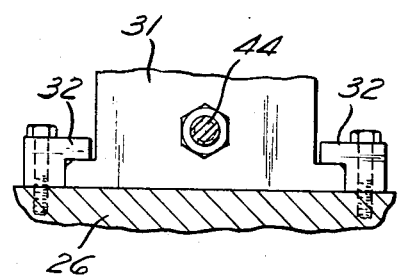
FIG. 3 is a fragmentary section taken along 3—3 of FIG. 2.

Referring to FIG. 2, the indexing table 10 is provided with a platen 21 mounted on a cylindrical support shaft 22. The shaft 22 is journaled on upper and lower table support bearings 23 and 24 which are, in turn, mounted in the machine frame 26. The table is, therefore, rotatable about the axis 11 of the support shaft 22. Step-by-step indexing rotation of the table is provided by an indexing drive including a drive gear 27 and a driven gear 28. Any suitable drive mechanism may be used to index the table so the details of the drive are not illustrated. However, reference may be made to my copending application, Ser. No. 686,641, filed Nov. 28, 1967, for a detailed description of one form of indexing drive.

The work holder 12 is rigidly secured to the indexing table 10 adjacent to the periphery of the platen 21. A work piece 29 is mounted in the collet of the holder 12 and is positioned adjacent to the work station 16a so that a processing operation may be performed thereon.

The processing device at the work station 16a includes a base 31 which is mounted on the frame 26 by ways 32 for limited movement relative to the frame 26 in a direction which is radial with respect to the axis 11. The base 31 supports the processing mechanism which performs the working operation on the work piece 29 at the work station 16a. This processing mechanism may be of any type. For example, it can include any of a large variety of cutting tools or the like. However, the illustrated processing mechanism is adapted to press an insert into the work piece 29. It includes a feed device 32 and a piston and cylinder actuator 33 arranged so that an insert is automatically positioned adjacent to the work piece 29 and is pressed thereunto by the actuator 33. It should be understood that this particular mechanism is illustrated only by way of example of one mechanism to which the invention is particularly suited.

Directly below the work piece holder on the underside and near the edge of the indexing table platen 21 is a circular ring or rail 36 formed with an inner cylindrical bearing surface 37 which is coaxial with the axis 11. Mounted on the base 31 is a radially inward projecting arm 38 which extends under the rail 36 and is provided with a roller 39 engagable with the cylindrical surface 37. When the actuator 33 produces a force against the work piece 29, the reaction force is transmitted back to the base 31 through the adjacent portion of the platen 21, the rail 36, the roller 39, and the arm 38. Therefore, a substantial portion of the reaction force is transmitted directly between the work holder 12 and the tool support base 31. This minimizes the magnitude of the reaction forces applied to the table and its bearings 23 and 24.

Because the base 31 is free floating in a radial direction, proper engagement is maintained between the roller 39 and the rail 36 while the actuator is functioning. In order to prevent loss of contact between the rail 36 and the roller bearing 39, a spring 41 may be provided. This spring acts between a projection 42 on the base 26 and the head 43 of a bolt 44 which is mounted on the base 31. The spring, therefore, serves to resiliently urge the base in a radially outward direction to maintain proper engagement between the roller 39 and the rail 36 at all times. In the illustrated embodiment, the ring 36 is continuous around the entire periphery of the platen 21. However, separate bearing sectors can be positioned on the table so that proper engagement is provided each time a work holder is positioned at the work station 16a.

Preferably the engagement between the roller 39 and the rail 36 should be located as close as possible to the line of action of the force on the work piece 29 since any displacement therefrom results in some force being applied to the main table bearings. Further, the direction of free movement of the base 31 should be in the same direction as the working force applied to the work piece so that lateral movement components are not encountered. Still further, the surface engagement between the roller 39 and the rail 36 should be perpendicular to the direction of the reaction force so that this engagement does not produce lateral components of force.

In the second embodiment of this invention illustrated in FIGS. 5 and 6 force transmitting means are provided which directly grip the work piece so that none of the reaction force is transmitted to the indexing table structure. In this embodiment, the processing device 51 is again mounted on the frame 26 of the table adjacent to the periphery of the table platen 21 and in alignment with a work piece 52 carried by a work holder 12 in position for working by the processing device 51. In this instance the work piece 52 is provided with a radial flange 52a and a main body portion 52b having a diameter smaller than the diameter of the flange. Such a work piece is particularly adapted for use with a processing device as illustrated in FIGS. 5 and 6 since it provides a shoulder against which gripper jaws may be positioned in the manner discussed below. Such a work piece could, for example, be one part of a pipe union in which it is desired to insert a brass ring.

The processing device 51 includes a base 53 mounted on the frame 26 and supporting a slide 54 at its upper end. The slide 54 is generally rectangular in shape and is supported by bearing surfaces 56 in the base 53 for limited movement toward and away from the work piece 52.

A pair of jaws 56 and 57 are pivoted on the forward end of the slide 54 by pivot pins 58 and 59, respectively. The jaws are formed at their forward end so that when they are pivoted to the full line position of FIG. 6, they extend behind the flange 52a to limit movement of the slide 54 to the right beyond the position illustrated in the drawing relative to the work piece 52. A cam 61 is provided on each side of the slide 54 and is movable between a forward position illustrated in full line and a rearward position illustrated in phantom. Each of the cams 61 is provided with a cam face 62 at its forward end which engages the rearward ends of the two jaws 56 and 57 and cams them to the closed position, illustrated in full line in FIG. 6, when the cam is in the forward full line position. Movement of the cam 61 to the rearward phantom position allows the two jaws 56 and 57 to be opened by a spring 63. In this position, the jaws are clear of the work piece and free indexing can occur. Preferably, the cam 61 is formed so that an axial surface 64, aligned with the associated jaw pivot axis, engages a mating axial surface on each of the jaws when the jaws are moved to the closed position and prior to the application of working forces. With such a structure, there is no reaction force tending to push the cam rearwardly during the actual working operation.

The cams are guided by surfaces 65 in the slide and are connected to a pivot pin 66 which extends across the slide 54. Elongated slots 67 permit limited movement of the pin 66. The rearward end of a working tool 68 is also connected to the pivot pin 66 so that the tool 68 moves axially with respect to the slide 54 in unison with the cams 61. The tool 68 is guided within a bore formed in the slide 54 and is provided with a forward end at 69 proportioned and shaped to engage a ring or the like and press such ring into the work piece 52. When the tool is moved backward from the work piece, a subsequent ring can be positioned for insertion into a subsequent work piece by an automatic feed (not illustrated) or the like.

A power operated toggle linkage is connected to produce relative movement between the pivot pin 66 and the slide 54. This linkage includes a first link 71 pivoted at its forward end on the pivot pin 66 and pivoted at its rearward end on a cross pin 72 carried by the piston 73 of a piston and cylinder actuator 74. A second toggle link 76 is pivoted at one end on the pin 72 and at its rearward end on a cross pin 77 carried in a mounting block 78.

The mounting block 78 is pivoted by a pivot pin 79 on the slide 54. Positioned rearwardly of the mounting block 78 is a cap member 81 having an adjustment screw 82 threaded therein. A spring 83 extends between the cap 81 and the rearward end of the block 78 to urge it to the left as viewed in FIG. 6 away from the end of the adjustment screw 82. A second adjustment screw 84 limits the anti-clockwise rotation of the block 78 under the influence of the spring 83.

The cylinder of the actuator 74 is pivoted at 86 on the base 53 so that retraction of its piston 73 from the full line operated position of FIG. 6 to the phantom position causes retraction of the tool 68 and the cams 61 from their forward position to their retracted position. Since the screw 84 limits the counterclockwise movement of the mounting block 78 the retraction of the piston moves the tool and cams back to a retracted position determined by the adjustment of the screw 84. After the table has indexed a work piece into position in alignment with the processing device 51, the piston 73 extends to extend the toggle linkage and cause movement of the tool 68 and cam 61 to the left relative to the slide 54. The cams 61 are proportioned so that the jaws 56 and 57 close behind the flange 52a before any significant working force is applied to the work piece 52 by the tool 68.

When the working force applied by the tool 68 to the work piece 52 exceeds the force of the spring 83, the block 78 rotates about its pivot 77 in a clockwise direction until it engages the adjustment screw 82. This limits such rotary movement and adjustably determines the forwardmost position of the tool 68. Preferably, the various elements are proportioned so that the toggle linkage passes slightly over center to insure that the full force is applied by the tool 68. After the working operation is completed, the piston 73 again retracts returning the linkage to the retracted position and allowing the next indexing operation to occur.

In practice, the device is normally provided with feed means to automatically position the rings in front of the work piece for insertion into the work piece by the tool. Also, a limit switch (not illustrated) is mounted to sense the movement of the block 78 against the action of the spring into engagement with the screw 82. Such a switch in effect senses the fact that the tool 68 encountered a load and is preferably connected to the system control circuit so that the machine is automatically stopped in the event that a load is not encountered indicating that a ring was not properly positioned for insertion into a work piece or indicating the fact that a work piece was not presented at the work station. Similarly, such a signal is used to operate a counter.

With this embodiment the entire working force is contained within the slide assembly. The force of the tool on the work piece produces a reaction force in the jaw members which is transmitted back to the slide. This reaction force is then transmitted through the adjustment screw 82 back to the linkage. Since the slide 54 is free to float in the direction of the working force and the reaction force, all of the forces are absorbed within the assembly, excepting the force and reaction force involving the actuator 74. Since these forces are self-contained within the base, they do not result in any forces being applied to the indexing table.

In some instances the work piece will not provide a shape which permits the jaws to grip the work piece in the manner illustrated. In such instances, the mechanism is modified to permit the jaws to grip an appropriately located shoulder on the work piece support. In such a structure the forces are again transmitted directly back through the slide and no forces are applied to the indexing table structure.

With an embodiment of this invention as illustrated in FIGS. 5 and 6 extremely large working forces can be applied to the work piece without causing any deflection in the indexing table mechanism. In fact, the embodiment of FIGS. 5 and 6 is arranged to permit a forging operation in which a brass ring is forged into position in a work piece under forces in the order of 30,000 pounds. Of course, even larger forces could be handled in appropriately designed mechanisms.

With a machining system incorporating this invention, the magnitude of the forces applied to the main table bearings by the processing units is reduced so deflections of the table caused by such forces are reduced or eliminated. Therefore, accuracy of the positioning of the work piece is improved without resorting to massive structures. Consequently, the cost of manufacture of the machine system is reduced and bearing wear is also minimized.

Although preferred embodiments of this invention are illustrated, it is to be understood that various modifications and rearrangements of parts may be resorted to without departing from the scope of the invention as disclosed and claimed herein.

What is claimed is:

1. An indexing table comprising a frame, a table journaled on spaced bearings in said frame for step-by-step rotation about an axis, a plurality of work holders mounted on said table around said axis, a plurality of work piece processing devices mounted on said frame at work stations, said step-by-step rotation of said table progressively positioning a work piece at said work stations for progressive working of such work piece, at least one of said processing devices at one of said work stations causing a working force in a predetermined direction to be applied to the work holder at one work station, said one processing device being mounted on said frame for limited movement along a path in said predetermined direction, said one processing device being provided with a first bearing surface extending substantially perpendicular to said one direction, and a second bearing surface carried by said table associated with each work holder positioned so that a second bearing surface engages said first bearing surface when its associated tool holder is at said one work station, the interengagement between said first and second bearing surfaces supporting a substantial portion of the reaction force resulting from said working force and thereby preventing a substantial portion of said reaction force from being transmitted to said spaced bearings, said interengagement between said first and second bearing surfaces determining the position of said processing device along said path.

2. An indexing table as set forth in claim 1 wherein said predetermined direction of said force is substantially radial with respect to the axis of rotation of said table.

3. An indexing table as set forth in claim 1 wherein said second bearing surfaces are provided by a cylindrical surface coaxial with said axis.

4. An indexing table as set forth in claim 3 wherein said first bearing surface is provided by a roller carried by said one processing device.

5. An indexing table as set forth in claim 4 wherein said tool holders are mounted on one surface of said table, said second bearing surfaces project from the opposite surface of said table and said roller is mounted on an arm projecting along said opposite side of said table.

6. An indexing table as set forth in claim 5 wherein resilient means are provided to maintain engagement between said roller and said cylindrical surface.

7. An indexing system comprising a frame, a table assembly including a table journaled on bearings in said frame for step-by-step rotation around an axis, a plurality of work piece processing devices mounted on said frame at work stations around said axis, said table assembly including a plurality of work piece supports adapted to support a work piece, said step-by-step rotation of said table assembly progressively positioning a work piece at said work station for progressive working of said work piece by said work piece processing devices, at least one of said processing devices at one of said work stations being operable to cause a working force to be applied in a predetermined direction to a work piece at said one station, said one processing device including force transmitting means providing a first surface engagable with a mating surface carried by said table assembly, said work piece supports and said one processing device being mounted so that one of them is movable along a path relative to said table and bearings in the direction of said working force with engagement between said first surface and said mating surface determining the position of said one of them along said path, said force transmitting means operating to transmit a substantial part of the reaction force of said working force from said mating surface to said one processing device and preventing a substantial part of said reaction force from being transmitted to said bearings.

8. An indexing system as set forth in claim 7 wherein said mating surface is carried by said table assembly and moved into position for engagement by said one surface as a result of said step-by-step rotation.

9. An indexing system as set forth in claim 8 wherein said one surface and said mating surface extend transversely with respect to said predetermined direction.

10. An indexing table as set forth in claim 9 wherein said one processing device includes a tool engagable with a work piece at said one work station, said tool and said force transmitting means being mounted on said frame for limited movement in a direction opposite said one direction.

11. An indexing system as set forth in claim 10 wherein said one processing device is movable relative to said frame in said direction opposite said predetermined direction.

12. An indexing system as set forth in claim 11 wherein said predetermined direction of said force is substantially radial with respect to the axis of rotation of said table.

13. An indexing system as set forth in claim 12 wherein said mating surface is carried by said one work holder.

14. An indexing system as set forth in claim 13 wherein said mating surface is provided by said work piece at said one work station.

15. An indexing system as set forth in claim 14 wherein said first surfaces are provided by a pair of jaws carried by said one processing device and movable toward each other into an operative position in which they engage said mating surface on said work piece.

16. An indexing system as set forth in claim 15 wherein said one processing device includes a slide mounted on said frame for limited movement in said predetermined direction, said jaws are mounted on said slide, and said tool is movable relative to said slide, and power means are connected to produce relative movement between said slide and said tool.

17. An indexing system as set forth in claim 16 wherein said power means includes a toggle linkage connected between said tool and said slide, and an actuator for moving said toggle linkage.

18. An indexing system as set forth in claim 17 wherein said jaws are moved to said operative position in response to relative movement between said tool and said slide.

19. An indexing system as set forth in claim 18 wherein similar first surfaces are positioned symmetrically with respect to said tool for engagement with symmetrically located mating surfaces so that the entire reaction force is transmitted directly between said work piece and said processing device.

* * * * *